US011939521B2

(12) United States Patent
Cavazos Sepulveda et al.

(10) Patent No.: US 11,939,521 B2
(45) Date of Patent: Mar. 26, 2024

(54) REUSE OF HYPERSALINE BRINE WITH IONIC LIQUIDS

(71) Applicant: SAUDI ARABIAN OIL COMPANY, Dhahran (SA)

(72) Inventors: Adrian Cesar Cavazos Sepulveda, Nuevo Leon (MX); Abdulkareem AlSofi, Dhahran (SA); Subhash C. Ayirala, Dhahran (SA); Ahmed Gmira, Al-Khobar (SA); Ali Abdallah Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/821,049

(22) Filed: Aug. 19, 2022

(65) Prior Publication Data
US 2024/0059958 A1 Feb. 22, 2024

(51) Int. Cl.
*E21B 43/16* (2006.01)
*C09K 8/584* (2006.01)

(52) U.S. Cl.
CPC .............. *C09K 8/584* (2013.01); *E21B 43/16* (2013.01)

(58) Field of Classification Search
CPC ................................. E21B 43/16; C09K 8/584
See application file for complete search history.

(56) References Cited

U.S. PATENT DOCUMENTS

| 4,216,097 | A | 8/1980 | Stournas |
| 4,360,061 | A * | 11/1982 | Canter ........................ C08J 3/02 507/938 |
| 4,596,662 | A | 6/1986 | Walker et al. |
| 7,629,296 | B2 * | 12/2009 | Dahanayake .......... C09K 8/845 507/904 |
| 7,776,798 | B2 | 8/2010 | Subramanian et al. |
| 10,544,370 | B2 | 1/2020 | Mazyar et al. |
| 2015/0275634 | A1 | 10/2015 | Nguyen et al. |
| 2020/0399530 | A1 * | 12/2020 | Zakaria ................. C07C 215/40 |

FOREIGN PATENT DOCUMENTS

| GB | 2057533 A * | 4/1981 | ............. C09K 8/584 |
| GB | 2168095 A | 6/1986 | |
| WO | 2016110655 A1 | 7/2016 | |

OTHER PUBLICATIONS

Alarbah, Ali, et al., "Investigation of Different Ionic Liquids in Improving Oil Recovery Factor", Advances in Chemical Engineering and Science, Scientific Research Publishing, vol. 9, 2019, pp. 87-98 (12 pages).
Al-Ghalayini, Basil M.K., "Desalination in Saudi Arabia: An attractive investment opportunity", Arab News, Nov. 25, 2018, URL: <https://www.arabnews.com/node/1410576> (2 pages).

(Continued)

*Primary Examiner* — Matthew R Buck
(74) *Attorney, Agent, or Firm* — Osha Bergman Watanabe & Burton LLP

(57) ABSTRACT

A solution for injection to a formation containing hydrocarbons includes an ionic liquid and a brine having a salinity of at least 60,000 ppm total dissolved solids (TDS). The ionic liquid is configured to lower an interfacial tension between the solution and the hydrocarbons in the formation.

10 Claims, 1 Drawing Sheet

(56) References Cited

OTHER PUBLICATIONS

Burnett, David B. and John A. Veil, "Decision and Risk Analysis Study of the Injection of Desalination By-products into Oil and Gas-Producing Zones", SPE 86526, Society of Petroleum Engineers, Feb. 2004, pp. 1-14 (14 pages).

Greenlee, Lauren F., et al., "Reverse osmosis desalination: Water sources, technology, and today's challenges", Water Research, ScienceDirect, Elsevier Ltd., vol. 43, Mar. 2009, pp. 2317-2348 (32 pages).

Hezave, Ali Zeinolabedinin, et al., "Dynamic interfacial tension behavior between heavy crude oil and ionic liquid solution (1-dodecyl-3-methylimidazolium chloride ([C12mim] [Cl] + distilled or saline water/heavy crude oil)) as a new surfactant", Journal of Molecular Liquids, ScienceDirect, Elsevier B.V., vol. 187, Jun. 2013, pp. 83-89 (7 pages).

Hezave, Ali Zeinolabedini, et al., "Effect of different families (imidazolium and pyridinium) of ionic liquids-based surfactants on interfacial tension of water/crude oil system", Fluid Phase Equilibria, ScienceDirect, Elsevier B.V., vol. 360, 2013, pp. 139-145 (7 pages).

"Please Pass the Salt: Using Oil Fields for the Disposal of Concentrate from Desalination Plants", Reclamation Managing Water in the West: Desalination and Water Purification Research and Development Program Report No. 112, Texas Water Development Board Bureau of Economic Geology, Agreement No. 03-FC-81-0846, Sep. 2005 (248 pages).

Sakthivel, Sivabalan, et al., "Adsorption of aliphatic ionic liquids at low waxy crude oil-water interfaces and the effect of brine", Colloids and Surfaces A: Physicochemical and Engineering Aspects, ScienceDirect, Elsevier B.V., vol. 468, 2015, pp. 62-75 (14 pages).

Turosung, Sulemana Nuhu and Bisweswar Ghosh, "Application of Ionic Liquids in the Upstream Oil Industry—A Review", International Journal of Petrochemistry and Research, Madridge Publishing, Apr. 29, 2017, pp. 50-60 (11 pages).

Yada, Shiho, et al., "Unique interfacial adsorption behavior of a hydroxy group-containing amino acid surfactant", Colloids and Surfaces A: Physicochemical and Engineering Aspects, ScienceDirect, Elsevier B.V., vol. 611, No. 125757, 2021 (5 pages).

A. Bera et al., "Recent advance in ionic liquids as alternaive to surfactants/chemicals for application in upstream oil industry", Jounal of Industrial and Engineering Chemistry, 2020, vol. 82, pp. 17-30 (14 pages).

A. Sanati et al., "Utilization of ionic liquids and deep eutectic solvents in oil operations: Progress and challenges", Jounal of Molecular Liquids, 2022, vol. 361, pp. 1-28 (28 pages).

International Search Report and Written Opinion issued in corresponding International Application No. PCT/US2023/030526, dated Dec. 18, 2023 (17 pages).

* cited by examiner

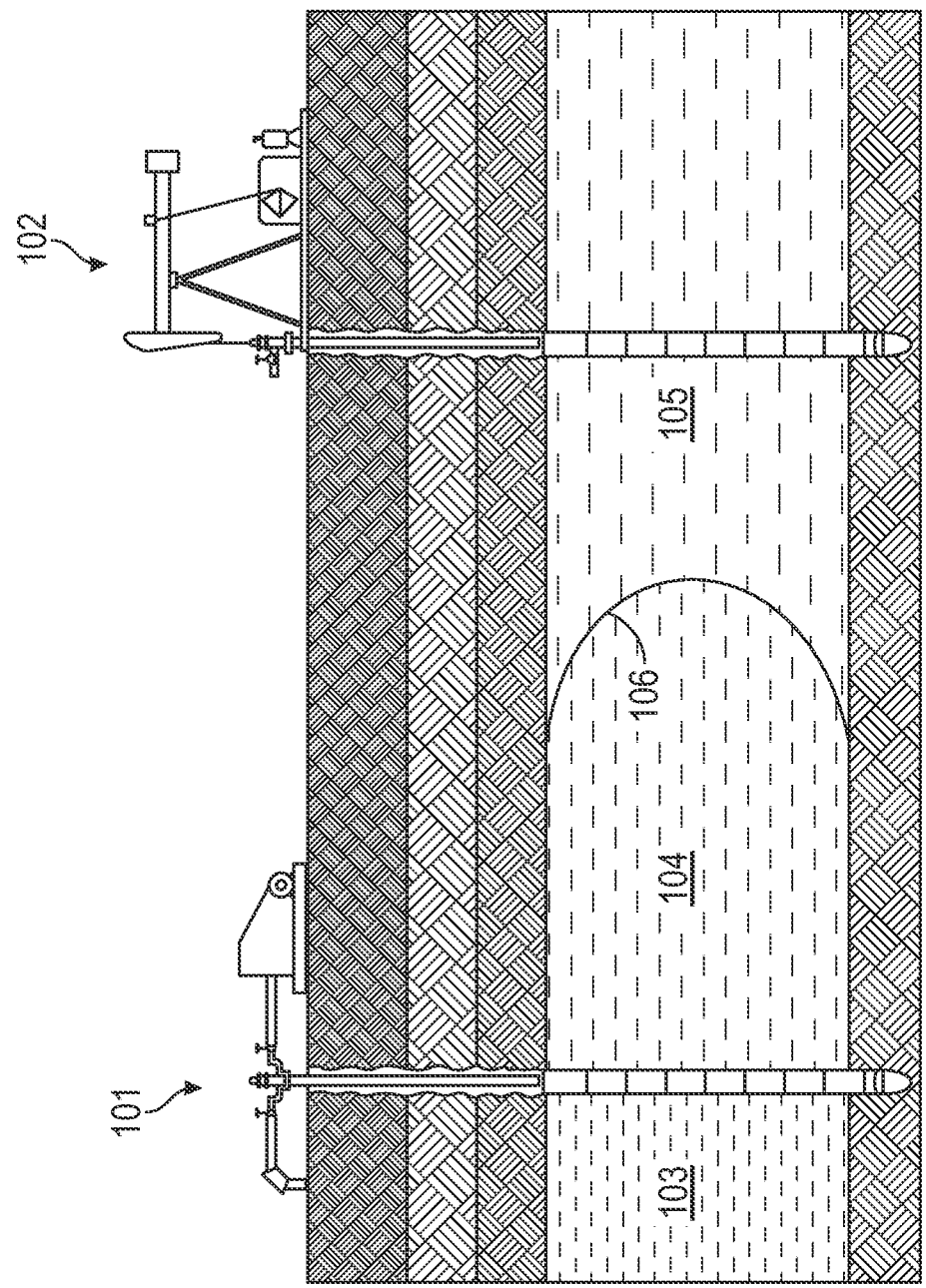

REUSE OF HYPERSALINE BRINE WITH IONIC LIQUIDS

BACKGROUND

Brine is a high-concentration solution of salt in water. Brine may form naturally due to evaporation of ground saline water, and is also a byproduct of many industrial processes, such as desalination. Brine, due to its high salinity, has an adverse impact on environment, so it requires viable and cost-effective brine management methods for proper disposal or further utilization.

Conventionally, various disposal methods have been practiced. For example, surface water discharge and sewer discharge methods center on dumping the brine into water mass. Evaporation ponds, having very large surface areas, are artificial ponds designed to evaporate water by sunlight and expose water to the ambient temperatures. Deep well injection involves drilling beneath drinking water aquifers (1,500 to >3,000 feet deep) to trap the brine under multiple impermeable layers of rock, which requires favorable geology and is not suitable for all locations. Brine concentrator uses membranes and the principles of osmosis to separate water from salt. However, these conventional disposal methods are unsustainable and are restricted by high capital costs and non-universal application. Accordingly, there exists a need for alternative methods that are environmentally friendly and cost effective.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a solution for injection to a formation containing hydrocarbons, comprising an ionic liquid; and a brine having a salinity of at least 60,000 ppm total dissolved solids (TDS). The ionic liquid is configured to lower an interfacial tension between the solution and the hydrocarbons in the formation.

In one or more embodiments, the ionic liquid comprises at least one of a quaternary ammonium salt and a quaternary phosphonium salt.

In one or more embodiments, the ionic liquid is an imidazolium salt, a pyridinium salt, a pyrimidinium salt, a pyrrolium salt, an indolium salt, or a combination thereof.

In one or more embodiments, the ionic liquid comprises hexadecyl (2-hydroxyethyl) dimethylammonium dihydrogen phosphate, 1-benzyl-3-methylimidazolium chloride, 1-butyl-3-methylimidazolium hydrogen sulfate, or a combination thereof.

In one or more embodiments, a concentration of the ionic liquid in the solution is from 50 ppb to 15000 ppm.

In one or more embodiments, the brine comprise a reverse osmosis reject, a nanofiltration reject, a produced water, or a combination thereof.

In another aspect, embodiments disclosed herein relate to a method, comprising mixing an ionic liquid and a brine to form a solution, the brine having a salinity of at least 60,000 ppm total dissolved solids (TDS); and injecting the solution to a formation comprising hydrocarbons. An interfacial tension presents between the solution and the hydrocarbons, and presence of the ionic liquid in the solution lowers a value of the interfacial tension.

In one or more embodiments, the ionic liquid comprises at least one of a quaternary ammonium salt and a quaternary phosphonium salt.

In one or more embodiments, the ionic liquid is an imidazolium salt, a pyridinium salt, a pyrimidinium salt, a pyrrolium salt, an indolium salt, or a combination thereof.

In one or more embodiments, the ionic liquid comprises hexadecyl (2-hydroxyethyl) dimethylammonium dihydrogen phosphate, 1-benzyl-3-methylimidazolium chloride, 1-butyl-3-methylimidazolium hydrogen sulfate, or a combination thereof.

In one or more embodiments, a concentration of the ionic liquid in the solution is from 50 ppb to 15000 ppm.

In one or more embodiments, the brine is a reverse osmosis reject, a nanofiltration reject, a produced water, or a combination thereof.

Other aspects and advantages of the claimed subject matter will be apparent from the following description and the appended claims.

BRIEF DESCRIPTION OF DRAWINGS

FIG. 1 shows a system for reusing brine in oil recovery according to one or more embodiments.

DETAILED DESCRIPTION

Specific embodiments of the disclosure will now be described in detail with reference to the accompanying FIGURES. Like elements in the various FIGURES are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

The processes of oil extraction may include multiple stages. Primary recovery, as an initial stage, uses the existing disparity in pressure between the surface and the oil and gas reservoir in order to propel oil to the surface. The oil recovered from primary recovery is only a portion of oil present in the hydrocarbon-bearing formation, typically ranging from 5% to 35%. In order to improve production, improved oil recovery (IOR) and enhanced oil recovery (EOR) methods have been developed to increase the amount of oil that may be recovered beyond that recovered in primary recovery.

Waterflooding, in which water is injected through an injection well into the formation to mobilize and drive oil to a production well, is a widely used method of secondary recovery to increase the amount of oil recovered from the reservoir beyond primary recovery. Recovery of residual oil trapped inside the reservoir is mostly influenced by key factors namely, capillary forces, viscous forces, contact angle, wettability, surface tension, and interfacial tension. Reduction in the capillary forces and interfacial tension helps in smoothening the mobilization of residual oil followed by its recovery. Mobilization facilitation of residual oil requires a reduction in the capillary forces within the reservoir which is to be achieved by lowering the interfacial tension during waterflooding processes. The high salinity conditions in the reservoir make it difficult to reduce the interfacial tension. Classical methods using additives such as polymers and surfactants lose their efficiency at high salinity conditions. In addition, when the brine contains a high salinity, the injection of hypersaline brine into the oil and gas reservoir may cause unwanted side effects, such as formation damage including scale formation and migration of fines. The unwanted side effects may cause plugging of pores from scaling minerals, precipitates, or fines, leading to a reduction in oil production or injection rate of the brine.

One or more embodiments disclosed herein are directed to a system and a method for oil and gas applications, utilizing a solution injected to the formation that reuses hypersaline brine and is enhanced by addition of an ionic fluid. The solution, containing an ionic liquid, causes an interfacial tension reduction between the aqueous solution and the hydrocarbons in the formation and has an effect of altering the wettability capacity of formation rock, such as modifying the wettability of formation material from oil-wet to water-wet. The presence of ionic liquid in the solution does not affect, or positively affects, the interfacial tension reduction when a salinity in the brine increases. In addition, the presence of ionic liquid also decreases critical micelle concentration (CMC) as the salinity of the hypersaline increases, thus decreases a minimum concentration required to achieve significant results in EOR. Through a reduction in interfacial tension between the aqueous solution and hydrocarbons and the modification of the wettability of the formation, the solution provides greatly improved recovery potential in oil production. Accordingly, the system and method disclosed herein serves as a promising solution for disposal and reusing of brine, especially hypersaline brine, and is environment friendly and cost effective.

One or more embodiments of the solution comprise a brine, such as seawater or a hypersaline brine from industrial activities. Sources of the hypersaline brine may include desalination plants, power plants, water treatment plants, produced water from oil and gas extraction, nanofiltration (NF), reverse osmosis (RO) reject, pulp and paper mill effluent. The composition of the seawater or the hypersaline brine may be different depending on various sources and different geographic locations, and may include chloride, sodium, sulfate, magnesium, calcium, potassium, bicarbonate, bromide, borate, or other ions.

In one or more embodiments, the brine may include a seawater having from about ppm (parts per million) to about 60,000 ppm of total dissolved solids (TDS), from about 15,000 ppm to about 35,000 ppm of chloride, from about 10,000 ppm to about 20,000 ppm of sodium, from about 300 ppm to about 700 ppm of calcium, from about 1,000 ppm to about 3,000 of magnesium, and from about 2,000 ppm to about 5,000 ppm of sulfate. In a non-limiting example, the seawater may comprise about 57,000 ppm of TDS, about 32,000 ppm of chloride, about 18,000 ppm of sodium, about 600 ppm of calcium, about 2,100 ppm of magnesium, and about 4,300 ppm of sulfate.

In one or more embodiments, the hypersaline brine may include a RO reject, produced as a result of purifying water from potable sources using the reverse osmosis process, containing from about 70,000 ppm to about 100,000 ppm of TDS, from about to about 60,000 ppm of chloride, from about 20,000 to about 30,000 ppm of sodium, from about 1,500 to about 3,000 ppm of calcium, from about 2,500 to about 5,000 ppm of magnesium, and from about 5,000 to about 8,000 ppm of sulfate. In a non-limiting example, the RO reject may comprise about 90,000 ppm of TDS, about 50,000 ppm of chloride, about 27,500 ppm of sodium, about 2,100 ppm of calcium, about 3,800 ppm of magnesium, and about 6,800 ppm of sulfate.

In one or more embodiments, the hypersaline brine may include a NF reject, produced from a membrane filtration process to soften and disinfect water. Because NF membranes generally have a higher selectivity towards divalent and multivalent ions in comparison with monovalent ions, the NF reject may include higher concentrations of divalent and multivalent ions, such as calcium, magnesium, sulfate. In one or more embodiments, the NF reject may contain from about 60,000 ppm to about 90,000 ppm of TDS, from about 30,000 to about 40,000 ppm of chloride, from about 20,000 to about ppm of sodium, from about 500 to about 1,000 ppm of calcium, from about 4,000 to about 6,000 ppm of magnesium, and from about 15,000 to about 20,000 ppm of sulfate. In a non-limiting example, the NF reject may comprise about 80,000 ppm of TDS, about 36,500 ppm of chloride, about 21,000 ppm of sodium, about 800 ppm of calcium, about ppm of magnesium, and about 17,500 ppm of sulfate.

In one or more embodiments, the hypersaline brine may include a produced water, which is a byproduct during the extraction of oil and natural gas from underground formation brought to the surface, containing from about 80,000 ppm to about 210,000 ppm of TDS, from about 40,000 to about 100,000 ppm of chloride, from about 30,000 to about ppm of sodium, from about 7,500 to about 15,000 ppm of calcium, from about 750 to about 1,500 ppm of magnesium, and from about 500 to about 1,000 ppm of sulfate. In a non-limiting example, the produced water may comprise about 96,000 ppm of TDS, about ppm of chloride, about 39,000 ppm of sodium, about 10,000 ppm of calcium, about 1,100 ppm of magnesium, and about 600 ppm of sulfate.

It is noted that the brine compositions, based on their various sources, may have different selectivity for individual ions and may not have a same ratio or concentration similar to those in the seawater. The examples disclosed herein are merely illustrative and should not be interpreted as limiting the scope of the present disclosure.

One or more embodiments of the solution comprise an ionic liquid. In one or more embodiments, a concentration of the ionic liquid in the solution is in a range of from about ppb (parts per billion) to about 15000 ppm.

In one or more embodiments, the ionic liquid may be a polymeric ionic liquid. Non-limiting examples may include poly(2-dimethylaminoethyl methacrylate), poly(vinylbenzyl ammonium)s, poly(diallyldimethylammonium chloride), poly(trimethyl-4-vinyl-benzylphosphonium chloride), polyt (trimethyl-4-vinyl-benzylphosphonium bis(trifluoromehtane)sulfonamide).

In one or more embodiments, the ionic liquid may be a quaternary ammonium salt. Non-limiting examples may include methylbenzethonium chloride, benzalkonium chloride, cetalkonium chloride, cetrimonium, sodium chloride, domiphen bromide, cetylpyridinium chloride, didecyldimethylammonium chloride, benzethonium chloride, tetraethylammonium bromide, cetyltrimethylammonium bromide (CTAB), and lauryl trimethylammonium bromide (dodecyltrimethylammonium bromide, DTAB).

In one or more embodiments, the ionic liquid may be salts with nitrogenous functionality. Non-limiting examples of the ionic liquid may include imidazolium salt, pyridinium salt, pyrimidinium salt, pyrrolium salt, and indolium salt classes of compounds. Non-limiting examples of the ionic liquid may include 1-benzyl-3-methylimidazolium chloride ([Bnmim][Cl]), 1-butyl-3-methylimidazolium hydrogen sulfate ([Bmim][HSO$_4$]), 1-dodecyl-3-methylimidazolium chloride ([C$_{12}$mim][Cl]), 1-octyl-3-methylimidazolium chloride ([C$_8$mim][Cl]), 1-dodecyl pyridinium chloride ([C$_{12}$Py][Cl]), 1-octyl pyridinium chloride ([C$_8$Py][Cl]), diethylammonium dihydrogen phosphate ([Et$_2$NH$_2$][H$_2$PO$_4$]), diethylammonium sulfate ([Et$_2$NH$_2$][HSO$_4$]), triethylammonium acetate ([Et$_3$NH][CH$_3$COO]), triethylammonium tetrafluroborate ([Et$_3$NH][BF$_4$]), triethylammonium hydrogen sulfate ([Et$_3$NH][H$_2$PO$_4$]), triethylammonium hydrogen sulfate ([Et$_3$NH][HSO$_4$]), tripropylammonium sulfate ([Pr$_3$NH][HSO$_4$]), tributylammonium sulfate ([Bu$_3$NH][HSO$_4$]), diethanolammonium dihydrogen phosphate ([OH-Et$_2$NH$_2$][H$_2$PO$_4$]), diethanolammonium hydrogen sulfate ([OH-Et$_2$NH$_2$][HSO$_4$]), triethanolammonium acetate ([OH-Et$_3$NH][CH$_3$COO]), triethanolammonium tetrafluoroborate ([OH-Et$_3$NH][BF$_4$]), triethanolammonium dihydrogen phosphate ([OH-Et$_3$NH][H$_2$PO$_4$]), triethanolammonium hydrogen sulfate ([OH-Et$_3$NH][HSO$_4$]), tripropanolammonium hydrogen sulfate ([OH—Pr$_3$NH][HSO$_4$]), and tributanolammonium hydrogen sulfate ([OH-Bu$_3$NH][HSO$_4$]).

In one or more embodiments, the ionic liquid may be salts with organophosphorus functionality, for example, quaternary phosphonium salts. In other words, the ionic liquid may be phosphonium analogues of previously described ammonium-based ionic liquids. Non-limiting examples may include tetradecyl(trihexyl)phosphonium chloride, tetradecyl(trihexyl)phosphonium bromide, tetradecyl(trihexyl) phosphonium decanoate, tetradecyl(trihexyl)phosphonium bis(2,4,4-trimethylpentyl)phosphinate, tetradecyl(trihexyl) phosphonium dicyanamide, triisobutyl(methyl)phosphonium tosylate, tributyl(methyl)phosphonium methylsulfate, tetradecyl(trihexyl)phosphonium bistriflamide, tetradecyl (trihexyl)phosphonium hexafluorophosphate, tetradecyl(trihexyl)phosphonium tetrafluoroborate, tributyl(methyl)phosphonium tosylate, tributyl(hexadecyl)phosphonium bromide, tetrabutylphosphonium bromide, tetrabutylphosphonium chloride, tetraoctylphosphonium bromide, tetradecyl(tributyl)phosphonium chloride, ethyltri(butyl)phosphonium diethylphosphate, tetradecyl(tributyl) phosphonium dodecylsulfonate, tetradecyl(trihexyl) phosphonium dodecylsulfonate, tetrabutylphosphonium glycolate, triisobutyl(ethyl)phosphonium triethyl(methoxyethyl)phosphonium bromide, (trihexyl)tetradecylphosphonium diisobutylmonothiophosphate, tri(i-butyl)methylphosphonium chloride, triethyl[2-(2-methoxyethoxy)ethyl] phosphonium, tri(i-butyl)methyl dimethyl phosphonium tosylate, trihexylmethylphosphonium tosylate, trihexylethylphosphonium tosylate, tetrabutylphosphonium benzoate, tetrabutylphosphonium tridecylsulfosuccinate, (trihexyl)tetradecylphosphonium diisobutyldithiophosphate, (trihexyl)tetradecylphosphonium bis(2-ethylhexyl)phosphate, (trihexyl)tetradecylphosphonium 2-ethylhexanoate, tetrabutylphosphonium methanesulfonate, tetrabutylphosphonium tetrafluoroborate, tributylmethylphosphonium dibutyl, tributylmethylphosphonium methyl, triethylmethylphosphonium dibutyl, trihexyltetradecylphosphonium bis(2,4,4-trimethylpentyl)phosphinate, trihexyl(tetradecyl)phosphonium bis[oxalato(2-)]borate, and hexadecyl (2-hydroxyethyl) dimethylammonium dihydrogen phosphate. Non-limiting examples may also include trihexyl (tetradecyl)phosphonium (P$_{6,6,6,14}$) and tributyl(tetradecyl) phosphonium (P$_{4,4,4,14}$) cations with any anion.

It is noted that, the cations and anions of the ionic liquids are not limited to previously described examples and may be rematch. The anions that may be used are not limited to any one from the group of chlorides, acetates, tetrafluoroborates, sulfates, or combinations thereof. Other non-limiting examples of anions include iodide, bromide, fluoride, acetate, hexafluorophosphate, sulfates, nitrate, nitrite, phosphate, chlorate, cyanate, anionic transition metal complex, tetrafluoroborate (BF$_4$), hexafluorophosphate (PF$_6$), bis-trifluoromethanesulfonimide (NTf$_2$), trifluoromethanesulfonate (OTO, dicyanamide (N(CN)$_2$), hydrogen sulfate (HSO$_4$), and ethyl sulfate (EtOSO$_3$). In one or more embodiments, anions in the ionic liquid have higher valence states, such as divalent or trivalent states. Ionic liquids comprising higher valence states may show improved properties in oil production than ionic liquids comprising monovalent ions, because multivalent ions can disrupt the attractive forces of the rock surface, water, and oil by binding at both oil and solid/water interfaces and/or bridge between them. In one or more embodiments, anions in the ionic liquid have higher valence states with hydrogen, which are beneficial by forming hydrogen bonds. The hydrogen bonds formed between components in oil, in particular heavy oils, and the ionic liquids may help detaching the oil components from rock surface.

The inclusion of ionic liquid reduces interfacial tension between aqueous solution and hydrocarbons, and significantly changes the wettability of the formation and provides surprising and unexpected results in reusing hypersaline brines. Wettability of the hydrocarbon-bearing formation can be modified by introduction of the ionic liquid to the formation, so much so that the formation may change from oil-wet to water-wet immediately. With presence of the ionic liquid, the interfacial tension is not substantially affected, or is positively affected, by increased salinity in the hypersaline brine. One or more embodiments of the ionic liquid demonstrates a similar or lower interfacial tension with increased salinity and therefore, is beneficial especially when reusing hypersaline brines (such as RO reject, NF reject, and produced water) containing a higher salinity than that of seawater. In other words, the solution comprising hypersaline brine with addition of the ionic liquid disclosed herein results in at least an equivalent efficacy to a seawater or fresh water when injected to enhance oil recovery.

Embodiments disclosed herein relate generally to a system for reusing a brine in oil recovery, utilizing a solution that comprises at least a brine and an ionic liquid. FIG. 1 shows a schematic diagram in accordance with one or more embodiments. As illustrated in FIG. 1, the system may include an injection well 101 and a production well 102. The solution may be injected through the injection well 101 into a subsurface reservoir 103 using an injection device, such as a pump. The injected solution 104 is driven to move through an hydrocarbon-bearing formation within the reservoir 103, mobilizing trapped and bypassed oil and forcing mobilized oil 105 (hydrocarbons) towards the production well 102. The production well 102 may comprise a lifting system, such as a pump, for elevating mobilized oil to surface. The solution 104 may comprise at least a brine and an ionic fluid according to previously described embodiments of the present invention. At an interface 106 between the solution and the mobilized oil, the ionic liquid may reduce the interfacial tension at the interface, even when the solution contains brine with high salinity.

FIG. 1 is provided as one exemplary application of the system used for injection to enhance oil recovery. However, one of ordinary skill in the art would recognize that the system of FIG. 1 is non-limiting, and that the system may be used for other oilfield applications, such as descaling, corrosion prevention, and remediation.

In one or more embodiments, the brine in the solution includes a RO reject or a NF reject from desalination plants or other industrial activities. In one or more embodiments, the brine in the solution includes a produced water that comes out of a well in oil production. In a non-limiting example, produced water generated from the production well 102 may be recycled and injected back to the injection well, with addition of an ionic liquid, to enhance oil recovery.

Embodiments disclosed herein relate generally to a method of reusing a brine in oil recovery, assisted by addition of an ionic liquid. The method includes collecting a brine having a salinity, mixing an ionic liquid and the brine to form a solution, and injecting the solution to a well. The brine may contain different levels of salinity, depending on its source. The brine may include seawater or may be a hypersaline brine, having a salinity of at least about 30,000 ppm of TDS. One or more embodiments of the brine may have a TDS of from about 30,000 ppm to about 500,000 ppm, or from about 30,000 to about 250,000 ppm, or from about 60,000 ppm to about 200,000 ppm.

EXAMPLES

The following examples illustrate one or more features of the present disclosure. It should be understood that these examples are not intended to limit the scope of the disclosure or the appended claims in any manner.

Example 1

One or more embodiments of the solution was made by dissolving an ionic liquid hexadecyl(2-hydroxyethyl)dimethylammonium dihydrogen phosphate in a saline brine at a concentration of 200 ppm. The saline brine had a composition of chlorides: 32,000 ppm; sodium: 18,000 ppm; calcium: 600 ppm, magnesium: 2,100 ppm; and sulfates: 4,300 ppm.

IFT of the example was measured using a spinning drop tensiometer (SDT). A spinning speed was set at 10,000 rpm and the IFT between was measured at 80° C. and room temperature, respectively. Spinning drop measurements indicated that the IFT between the crude oil and the solution, containing the ionic liquid in the saline brine, was reduced to 1.2 mN/m at 80° C. and 0.39 mN/m at room temperature.

Unless defined otherwise, all technical and scientific terms used have the same meaning as commonly understood by one of ordinary skill in the art to which these systems, apparatuses, methods, processes, and compositions belong.

As used here and in the appended claims, the words "comprise," "has," and "include" and all grammatical variations thereof are each intended to have an open, non-limiting meaning that does not exclude additional elements or steps.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A solution for injection to a formation containing hydrocarbons, comprising:
   an ionic liquid; and
   a brine having a salinity of at least 60,000 ppm total dissolved solids (TDS),
   wherein the ionic liquid is configured to lower an interfacial tension between the solution and the hydrocarbons in the formation, and
   wherein the ionic liquid comprises hexadecyl (2-hydroxyethyl) dimethylammonium dihydrogen phosphate, 1-benzyl-3-methylimidazolium chloride, 1-butyl-3-methylimidazolium hydrogen sulfate, or a combination thereof.

2. The solution according to claim 1, wherein the ionic liquid comprises a quaternary phosphonium salt.

3. The solution according to claim 1, wherein the ionic liquid comprises a pyridinium salt, a pyrimidinium salt, a pyrrolium salt, an indolium salt, or a combination thereof.

4. The solution according to claim 1, wherein a concentration of the ionic liquid in the solution is from 50 ppb to 15000 ppm.

5. The solution according to claim 1, wherein the brine is a reverse osmosis reject, a nanofiltration reject, a produced water, or a combination thereof.

6. A method, comprising:
   mixing an ionic liquid and a brine to form a solution, the brine having a salinity of at least ppm total dissolved solids (TDS); and
   injecting the solution to a formation comprising hydrocarbons,
   wherein the ionic liquid comprises hexadecyl (2-hydroxyethyl) dimethylammonium dihydrogen phosphate, 1-benzyl-3-methylimidazolium chloride, 1-butyl-3-methylimidazolium hydrogen sulfate, or a combination thereof,
   wherein an interfacial tension presents between the solution and the hydrocarbons, and
   wherein presence of the ionic liquid in the solution lowers a value of the interfacial tension.

7. The method according to claim 6, wherein the ionic liquid comprises a quaternary phosphonium salt.

8. The method according to claim 6, wherein the ionic liquid comprises an imidazolium salt, a pyridinium salt, a pyrimidinium salt, a pyrrolium salt, an indolium salt, or a combination thereof.

9. The method according to claim 6, wherein a concentration of the ionic liquid in the solution is from 50 ppb to 15000 ppm.

10. The method according to claim 6, wherein the brine is a reverse osmosis reject, a nanofiltration reject, a produced water, or a combination thereof.

* * * * *